(12) United States Patent
Quilot et al.

(10) Patent No.: US 9,836,884 B2
(45) Date of Patent: *Dec. 5, 2017

(54) PARAMETERIZING A 3D MODELED OBJECT FOR TESSELLATION

(71) Applicant: Dassault Systemes, Velizy Villacoublay (FR)

(72) Inventors: Laurent Quilot, Chaville (FR); Abdelmonem Feki, Massy (FR); Tuan Anh Phung, Sartrouville (FR); Daniel Roudil, Paris (FR)

(73) Assignee: Dassault Systemes, Velizy, Villacoublay (FR)

( * ) Notice: Subject to any disclaimer, the term of this patent is extended or adjusted under 35 U.S.C. 154(b) by 168 days.

This patent is subject to a terminal disclaimer.

(21) Appl. No.: 14/139,539

(22) Filed: Dec. 23, 2013

(65) Prior Publication Data

US 2014/0184599 A1   Jul. 3, 2014

(30) Foreign Application Priority Data

Dec. 28, 2012   (EP) .................................... 12306696

(51) Int. Cl.
  *G06T 15/30*   (2011.01)
  *G06T 17/20*   (2006.01)
  *G06T 17/30*   (2006.01)

(52) U.S. Cl.
  CPC .............. *G06T 17/20* (2013.01); *G06T 17/30* (2013.01)

(58) Field of Classification Search
  None
  See application file for complete search history.

(56) References Cited

U.S. PATENT DOCUMENTS

| 5,630,041 | A  | 5/1997  | Mills |
| 6,271,856 | B1 | 8/2001  | Krishnamurthy |
| 8,269,770 | B1 | 9/2012  | Carr et al. |
| 8,471,852 | B1 | 6/2013  | Bunnell |
| 9,196,090 | B2 | 11/2015 | Maisonneuve |
| 2003/0218609 | A1 | 11/2003 | Maillot et al. |
| 2007/0176923 | A1 | 8/2007  | Lee et al. |
| 2008/0024499 | A1 | 1/2008  | Bateman |
| 2008/0036755 | A1 | 2/2008  | Bae et al. |
| 2008/0225043 | A1 | 9/2008  | Rosel |

(Continued)

OTHER PUBLICATIONS

Abi-Ezzi et al. (Fast Dynamic Tessellation of Trimmed NURBS Surfaced, vol. 13, 1994, Eurographics).*

(Continued)

*Primary Examiner* — Kyle Zhai
(74) *Attorney, Agent, or Firm* — Hamilton, Brook, Smith & Reynolds, P.C.

(57) ABSTRACT

It is proposed a computer-implemented method for parameterizing a three-dimensional modeled object for tessellation. The method comprising the steps of providing a boundary representation of the modeled object, the boundary representation comprising geometrical data including parametric surfaces and topological data including a set of faces each defined as a portion of the 2D domain of a respective parametric surface; determining 2D meshes each fitting a respective face; and associating the 2D meshes to the geometrical data of the boundary representation. Such a solution improves the tessellation of a 3D modeled object.

14 Claims, 12 Drawing Sheets

(56) References Cited

U.S. PATENT DOCUMENTS

| | | |
|---|---|---|
| 2009/0027396 A1 | 1/2009 | Frisken |
| 2009/0058853 A1 | 3/2009 | Chang |
| 2009/0201295 A1 | 8/2009 | Kripac et al. |
| 2010/0141659 A1* | 6/2010 | Bourd .................. G06T 11/203 345/442 |
| 2012/0206457 A1 | 8/2012 | Crocker |
| 2013/0120383 A1 | 5/2013 | Joshi et al. |
| 2013/0124149 A1 | 5/2013 | Carr et al. |
| 2013/0127874 A1* | 5/2013 | Peterson .................. G06T 13/80 345/473 |
| 2013/0271459 A1 | 10/2013 | Gary |
| 2014/0184598 A1 | 7/2014 | Quilot et al. |

OTHER PUBLICATIONS

Shimada et al. (Automatic triangular mesh generation of trimmed parametric surfaces for finite element analysis, Computer Aided Geometric Design 15, 1998, pp. 199-222).*

European Search Report from EP 12 30 6696, titled Parameterizing a 3D Modeled Object for Tessellation, dated Jun. 21, 2013.

Ng, W.M.M. and Tan, S.T., "Incremental Tessellation of Trimmed Paramteric Surfaces," *Computer Aided Design*, 32:279-294, (Apr. 1, 2000).

Kumar, S. and Manocha, D., "Efficient Rendering of Trimmed NURBS Surfaces," *Computer Aided Design*, 27(7):509-521, (Jul. 1, 1995).

Wang, D., et al., "EQSM: An Efficient High Quality Surface Grid Generation Method Based on Remeshing," *Computer Methods in Applied Mechanics Engineering*, 195(41-43):5621-5633, (Aug. 15, 2006).

Piegl, L.A. and Richard, A.M., "Tessellating Trimmed NURBS Surfaces," *Computer-Aided Design*, 27(1):16-26, (Jan. 1, 1995).

Yang, S.W., et al., "CAD Data Visualization on Mobile Devices Using Sequential Constrained Delaunay Triangulation," *Computer-Aided Design*, 41(5):375-384, (May 1, 2009).

Xianguang, L., et al., "Key Technology Research on Data Conversion Between B-Rep Based CAD and VR Model," *2009 International Conference on Measuring Technology and Mechatronics Automation, IEEE*, pp. 104-107, (Apr. 11, 2009).

Vlachos, A., et al., "Curved PN Triangles," *Proceeding of the 2001 Symposium on Internactive 3D Graphics. Research Triangle Park*, pp. 159-166, (Mar. 19, 2001).

Wolfgang Boehm, et al., "On de Casteljau's algorithm", Angewandte Geometrie und Computergraphik, Pockelsstrasse 14, Technische Universität, D-38106 Braunschweig, Germany, Oct. 1998, revised Apr. 1999, pp. 587-605.

Bezier, P., "Definition Numerique des Courbes et Surfaces," *Automatisme—Tome XI*, No. 12: 625-631 (Dec. 1966). (with translation).

Bezier, P., "Mathematical and Practical Possibilities of Unisurf," in *Computer Aided Geometric Design*, Published by Academic Press, Inc., New York, NY, pp. 127-152 (28 pages total) (1974).

Claux, F. et al., "An Efficient Trim Structure for Rendering Large B-Rep Models," Workshop on Vision, Modeling, & Visualization, Magdeburg, Germany, pp. 31-38 (Nov. 12, 2012).

de Boor, Carl, *A Practical Guide to Splines*, Published by Springer-Verlag, New York, NY, 8 pages (1978).

de Casteljau, Paul de Faget, *Le Lissage*, Published by Hermes, Paris, 1990, 5 pages (1990). (with translation).

Durlofsky, L.J. et al., "Advanced Techniques for Reservoir Simulation and Modeling of Nonconventional Wells," *Final Report to U.S. Department of Energy*, Contract No. DE-AC26-99BC15213, 1-213 (224 pages total) (Aug. 2004).

European Search Report for European Application No. EP 12 30 6697; dated Nov. 20, 2013.

Farin, Gerald, *Curves and Surfaces for CAGD: A Practical Guide*, 5th Edition, Published by Morgan-Kaufmann Publishers, San Francisco, California, 11 pages (2002).

Guthe, Michael et al., "GPU-based Trimming and Tessellation on NURBS and T-Spline Surfaces," *ACM Transactions on Graphics (TOG)*; 24: 1016-1023 (Jul. 2005).

Kumar, G.V.V. et al., "Geometry Based Triangulation of Multiple Trimmed NURBS Surfaces," *Computer-Aided Design*, 33: 439-454 (May 1, 2001).

Sheng, X. et al., "Triangulation of Trimmed Surfaces in Parametric Space," *Computer-Aided Design*, 24(8): 437-444 (Aug. 1, 1992).

P. de Casteljau Courbes et surfaces à pôles. Technical report, A. Citroen, Paris, 1963, (unable to locate reference). See http://www.alatown.com/spline/ for a description of the reference.

Farin, G., "Triangular Bernstein-Bézier patches", Department of Mathematics, University of Utah, Computer Aided Geometric Design, Jan. 14, 1986, pp. 83-127.

Yang, et al., "CAD data visualization on mobile devices using sequential constrained Delaunay triangulation", vol. 41, Issue 5, pp. 375-384, May 2009.

* cited by examiner

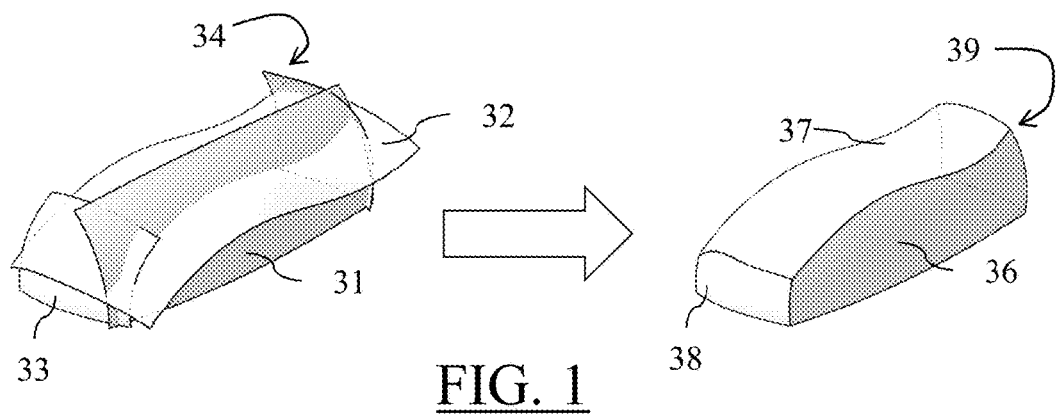
FIG. 1
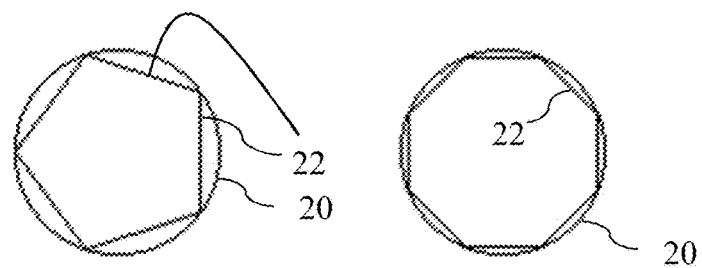
FIG. 2
FIG. 3
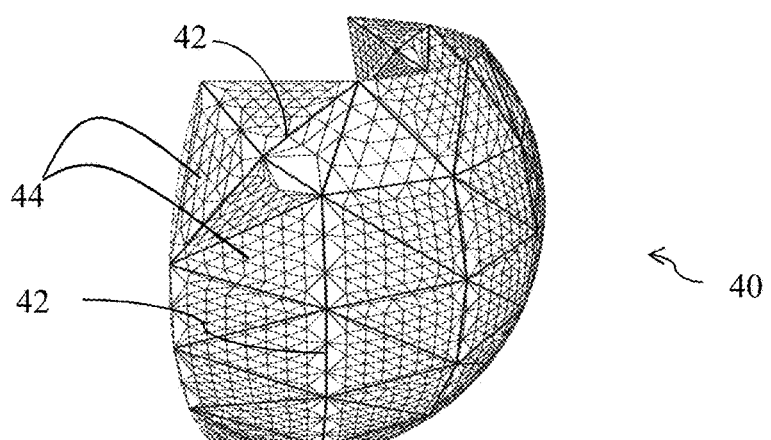
FIG. 4

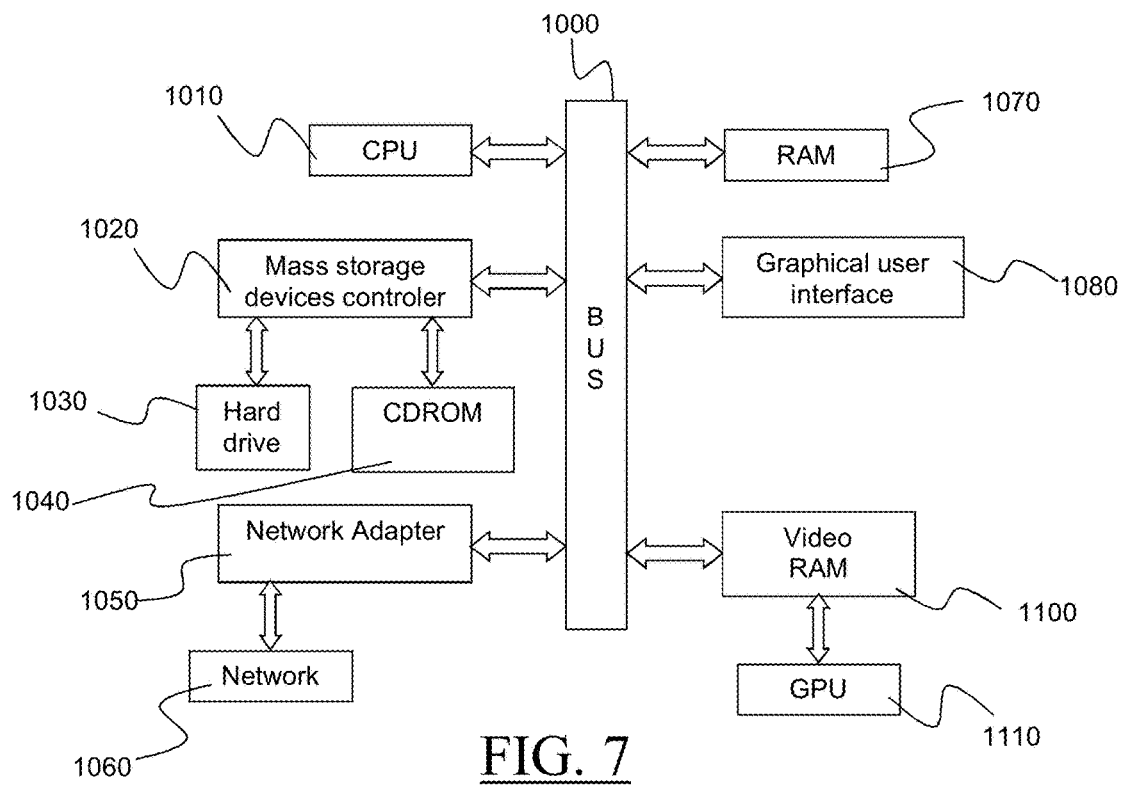
FIG. 7
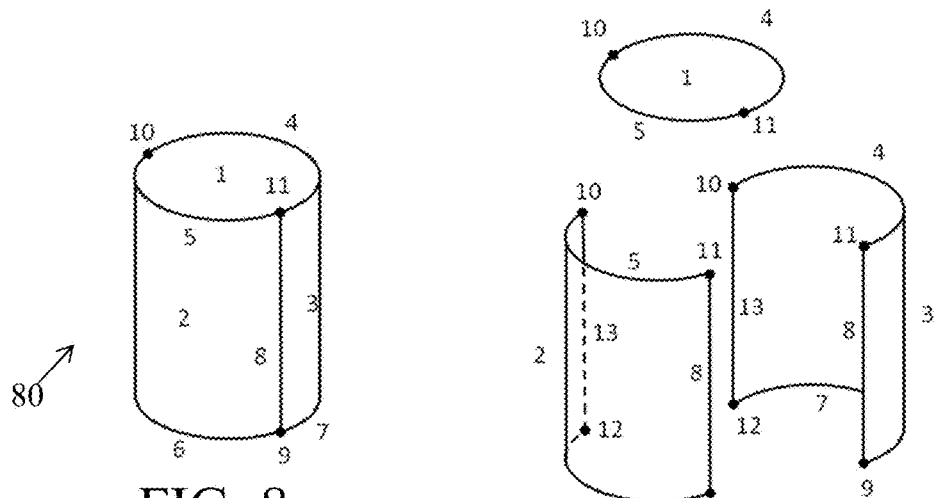
FIG. 8
FIG. 9

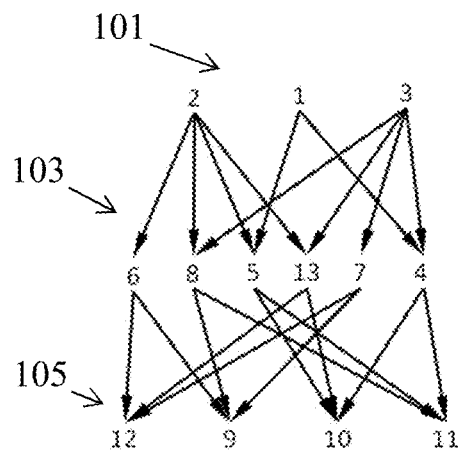
FIG. 10
1 → Plane
2 → Cylindrical surface
3 →
4 → Circle 1
5 →
6 → Circle 2
7 →
8 → Line 1
9 → Point 4
10 → Point 1
11 → Point 2
12 → Line 2
13 → Point 4
FIG. 11
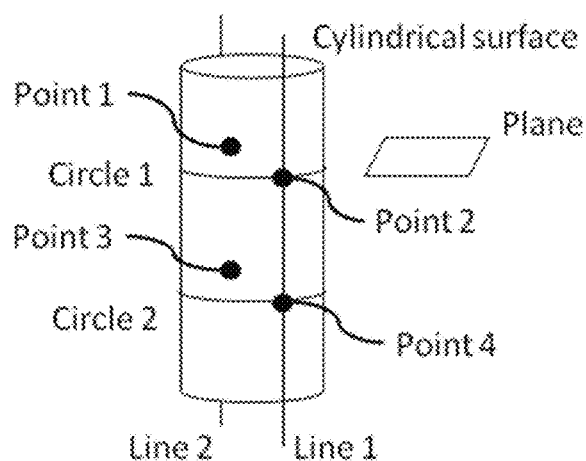
FIG. 12

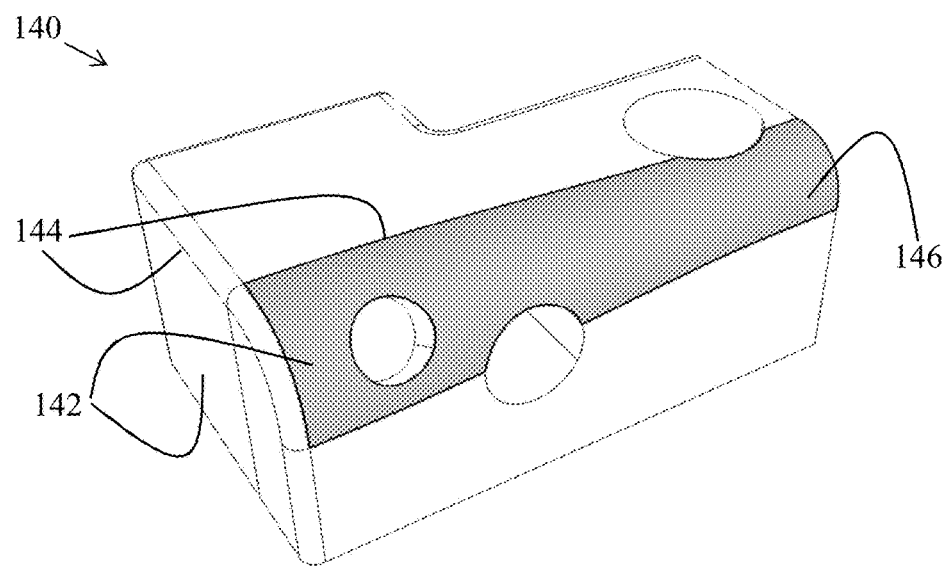
FIG. 14
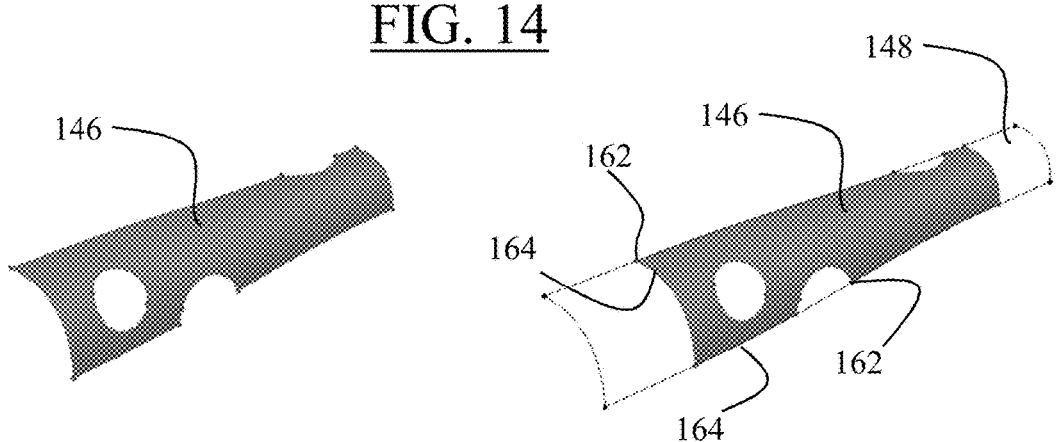
FIG. 15
FIG. 16

L1=3, L2=2, L3=5

L1=2, L2=7, L3=1

L1=1, L2=0, L3=0, L4=0

L1=1, L2=1, L3=0, L4=0

L1=1, L2=1, L3=1, L4=0

PARAMETERIZING A 3D MODELED OBJECT FOR TESSELLATION

RELATED APPLICATION(S)

This application claims priority under 35 U.S.C. §119 or 365 to European Patent Application No. 12306696.1 filed on Dec. 28, 2012. The teachings of the foregoing application are herein incorporated in their entirety.

FIELD OF THE INVENTION

The invention relates to the field of computer programs and systems, and more specifically to a method, system and program for parameterizing a three-dimensional modeled object for tessellation and/or for tessellating a three-dimensional modeled object parameterized for tessellation.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such systems, the graphical user interface (GUI) plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such systems allow defining surfaces representing modeled objects or parts of modeled objects in an interactive way for designers. A famous method frequently used in CAD systems is the boundary representation (B-Rep) model using parametric surfaces, including e.g. planes, quadrics such as cylinders, spheres, cones or even torus, procedural surfaces such as fillets, sweeps, or revolve surfaces, and/or non-uniform rational B-Spline surfaces (NURBS). Representing complex object with this technology may be performed via the widely known concept of trimmed surfaces. Trimmed surfaces allow designing any kind of surface and solid models. A trimmed surface is a parametric surface delimited by boundaries. A trimmed surface may typically be associated to a portion of the 2D domain of a respective parametric surface. For example, referring to FIG. 1, four surfaces 31-34 are trimmed resulting in four new delimited (or "trimmed") respective surfaces 36-39.

In other words, some known CAD systems allow designers to interactively define a B-Rep of a modeled object, the boundary representation comprising geometrical data including parametric surfaces and topological data including a set of faces each defined as a portion of the 2D domain of a respective parametric surface.

Once (or while being) defined by designers, such surfaces often need to be rendered, e.g. in order to be displayed. Systems offering rendering functionality may indeed for example display surfaces e.g. during the modeling or for the purpose of review/modification by designers. Today, a computer's Graphic Processor Unit (GPU) can display thousands of triangles really efficiently. However, a GPU cannot display a surface provided as a B-Rep directly. Such surfaces must be transformed into a set of primitives that can be handled by the GPU. This is also the case for geometric operators (i.e. operators performing geometric or Boolean operations on several surfaces, e.g. for collision tests). Such transformation is called tessellation. Known tessellation methods approximate a surface by covering said surface with a pattern of flat polygons, usually triangles, with no gaps or overlaps, so as to fit as best as possible the mathematical definition of that surface, and sometimes by associating normal vectors to the pattern of flat polygons equal to corresponding surface normal vectors (i.e. vectors normal to the initial surface at corresponding positions) for the purpose of surface shading.

Thus, a surface of a modeled object can be processed via two different models. The first model is the exact model, which stands for the mathematical definition of surfaces. With the exact model, a user can design the surface and apply, on the surface, operators such as trim, bevel, or fillet operators. The second model is an approximated model, which is a geometric representation of the exact model usually used for visualization and geometric operations. Approximating smooth surfaces with flat geometry leads to discretization problems. This is a well-known problem in CAD applications. The smallest subset of triangles must be found to approximate surface curvature as best as possible. In order to determine if the approximation is acceptable in relation to the exact surface, an error bound tolerance is usually defined by the user.

Two approaches to tessellation exist nowadays.

The first approach is called "static" tessellation. Static tessellation comprises directly transforming a surface into a set of flat triangles approximating the surface. Vertices constituting such triangles are determined from the exact model of the surface, and sometimes normal vectors are also computed from the exact model and associated to the vertices or the triangles. Systems offering static tessellation functionalities usually provide the possibility to the user to define a maximum deviation or error value. The tessellation is then performed so that the distance from the triangles to the original surface does not exceed the error bound tolerance or deviation defined by the user. FIGS. 2 and 3 schematically illustrate deviation between a surface 20 and its approximation with triangles 22. The deviation is larger on FIG. 2 than on FIG. 3 (the deviation is here represented as chordal deviation on a circle), because FIG. 3 uses more triangles 22 to approximate surface 20. Generally, given a maximum deviation (i.e. a constraint that the deviation must be inferior to a certain value called "maximum deviation") provided by the user, fewer triangles are needed in a flat area unlike in high curvature region where a higher density of triangles is needed to satisfy the given tolerance.

Static tessellation produces a heavy mesh with an average accuracy for vertices and normals and consumes huge memory for high curvature models, which is an issue when the approximate model is placed on persistent memory. Another issue with static tessellation appears when the accuracy needs to be increased. First of all, this is not always possible, because the exact model may have been previously discarded. Indeed, the exact model usually consumes a lot of memory space and may either be deleted, or discarded when the designer wants to send the modeled object elsewhere, e.g. for displaying and/or for geometric operations, e.g. to another user and/or another client system. With static tessellation and in such a case, only the approximated model consisting of the set of flat triangles respecting a maximum deviation pre-provided by the user is kept or sent, and a higher accuracy can never be reached (the exact information being lost). Second of all, in cases that the exact model is nevertheless kept, an issue is that, when demanding a higher accuracy, the tessellation has to be performed from scratch, i.e. from the exact model of the surface. This takes a lot of time.

In order to alleviate these issues, another approach to tessellation called "PNT tessellation" has been developed. The idea behind PNT tessellation is to use a multi-resolution model called "PNT". More precisely, the idea behind PNT tessellation is to parameterize a three-dimensional modeled object for tessellation, i.e. prepare the object for tessellation, so that less time is needed when the tessellation needs to be performed. As a result, re-doing the tessellation e.g. in order to increase the accuracy of the approximated model is less time-consuming than in the case of static tessellation (in the case when the exact model is available).

Specifically, PNT tessellation produces a piecewise approximation of a surface with a set of triangular patches (possibly non-flat). This results in a lightweight intermediate model representation called the "base mesh". FIG. 4 shows an example of a base mesh 40, with triangular patches 42, in bold, that are not (necessarily) flat, tessellated with smaller flat triangles 44. These triangular patches 42 approximate the exact surface e.g. using a cubic Bezier formulation. PNT tessellation is a good trade off in terms of memory and computation. Instead of keeping exact surfaces, this lightweight model is the entry point for visualization, and/or geometric operators. As it is a lightweight coarse approximation, a pre-compute, i.e. parameterization, step is needed where triangular patches are used to fit the surface definition for any kind of purpose. Then, in order to perform the actual tessellation starting from the model parameterized for the tessellation (i.e. the base mesh), each patch may be refined following a subdivision pattern (simpler and faster than the tessellation from scratch). The subdivision may be made on demand according to any required chordal deviation, in order to add more triangles where they are needed. These refined triangles are evaluated from the previous triangle formulation. The PNT approach thus allows to increase accuracy on demand even if the exact model is discarded (but under the condition that the base mesh is kept), in a relatively fast way. Also, the memory consumption is improved, as the base mesh generally consumes less memory space than the tessellated model.

However, PNT tessellation also presents issues. For example, the possibility to increase accuracy (without using the initial exact model, which may have been discarded) still has a limit, because the base mesh is only an approximation of the initial surface. Furthermore, the base mesh approximates the surface in terms of positions, but computing normal vectors from the base mesh may prove relatively inaccurate. As a cubic Bézier is used for vertices computation, normals are computed with a linear or quadratic interpolation. As a result, visualization artifacts happen while rendering the final mesh. For instance, surface representation and shading are deteriorated.

The above information is discussed in a number of papers, of which a list is provided below:

P. Bezier. Definition numerique des courbes et surfaces I. Automatisme, XI:625-632, 1966;

P. Bezier. Mathematical and practical possibilities of UNISURF. In R. Barnhill and R. Riesenfeld, editors, Computer Aided Geometric Design, pages 127-152. Academic Press, 1974;

C. de Boor A Practical Guide to Splines, Springer, 1978;

P. de Casteljau Courbes et surfaces a poles. Technical report, A. Citroen, Paris, 1963;

P. de Casteljau. Le Lissage. Hermes, Paris, 1990;

G. Farin. Curves and Surfaces for CAGD: A Practical Guide, Fifth Edition. Academic Press, San Diego, 2002;

Vlachos, J. Peters, C. Boyd, and J. L. Mitchell. Curved PN triangles. In Symposium;

on Interactive 3D Graphics, pages 159-166, 2001;

Guthe M., Balázs Á., and R. Klein, GPU-based Trimming and Tesselation of NURBS and T-Spline; and Surfaces, ACM SIGGRAPH conference proceedings, 2005.

The existing solutions mentioned above thus lack efficiency. Within this context, there is still a need for an improved solution for the tessellation of a 3D modeled object.

SUMMARY OF THE INVENTION

According to one aspect, it is therefore provided a computer-implemented method for parameterizing a three-dimensional modeled object for tessellation. The method comprises the step of providing a boundary representation of the modeled object. The boundary representation comprises geometrical data including parametric surfaces and topological data including a set of faces each defined as a portion of the 2D domain of a respective parametric surface. The method also comprises the steps of determining 2D meshes each fitting a respective face; and associating the 2D meshes to the geometrical data of the boundary representation.

The method may comprise one or more of the following:
  determining the 2D meshes comprises, for each respective face, subdividing boundary edges of the respective face into parametric arcs; defining a set of vertices within the respective face; and determining a partition of the respective face with parametric patches bounded by the parametric arcs and the vertices of the set of vertices;
  the parametric patches of the partition each have boundary arcs that do not cross each other and/or oneself, and/or the parametric patches of the partition avoid inner inversion;
  determining the 2D meshes further comprises, for each respective face, subdividing the partition according to criteria including at least a maximal deviation between the 3D meshes and the respective parametric surfaces;
  the criteria according to which subdividing the partition is performed further include a maximal number of times for further subdividing the 2D meshes before a step of determining 3D meshes by evaluating the position of vertices of the 2D meshes on the respective parametric surfaces;
  the subdividing of boundary edges of the respective face into parametric arcs is performed until none of the arcs cross each other;
  the parametric arcs are Bézier arcs and/or the parametric patches are Bézier patches; and/or for each pair of faces having a common boundary edge, the 2D meshes are determined to share the same vertices fitting the common boundary edge.

According to another aspect, it is provided a computer-implemented method for tessellating a three-dimensional modeled object parameterized for tessellation. The method for tessellating comprises the step of providing 2D meshes associated, according to the above method for parameterizing, to geometrical data of a boundary representation of the modeled object. The boundary representation comprises the geometrical data including parametric surfaces and topological data including a set of faces each defined as a portion of the 2D domain of a respective parametric surface. The method for tessellating also comprises determining 3D meshes by evaluating the position of vertices of the 2D meshes on the respective parametric surfaces.

The method for tessellating may comprise one or more of the following:
- the method further comprises subdividing the 2D meshes before determining the 3D meshes;
- the 2D meshes are associated to the geometrical data of the boundary representation of the modeled object according to claim 5, and the subdividing the 2D meshes before determining the 3D meshes is performed said maximal number of times;
- the geometrical data include parametric curves representing intersections between the parametric surfaces and the faces of the boundary representation each have boundary edges each defined as a portion of the domain of a respective parametric curve, and determining the 3D meshes further comprises evaluating the position of vertices of the 2D meshes fitting the boundary edges on the respective parametric curves; and/or
- the method further comprises associating to the 3D meshes normal vectors computed based on their respective parametric surfaces.

It is further proposed a computer program adapted to be recorded on a data storage medium, and comprising instructions for performing any of the above methods.

It is further proposed a (e.g. computer readable) data storage medium having recorded thereon the above computer program.

It is further proposed a CAD system comprising a processor coupled to a memory and a graphical user interface, the memory having recorded thereon the above computer program.

BRIEF DESCRIPTION OF THE DRAWINGS

Embodiments of the invention will now be described, by way of non-limiting example, and in reference to the accompanying drawings, where:

FIGS. 1-4 show examples of prior art;
FIG. 7 shows an example of a client system;
FIGS. 8-12 show an example of a B-Rep;
FIGS. 14-40 show illustrations of the method.

DETAILED DESCRIPTION OF THE INVENTION

Figure 5:
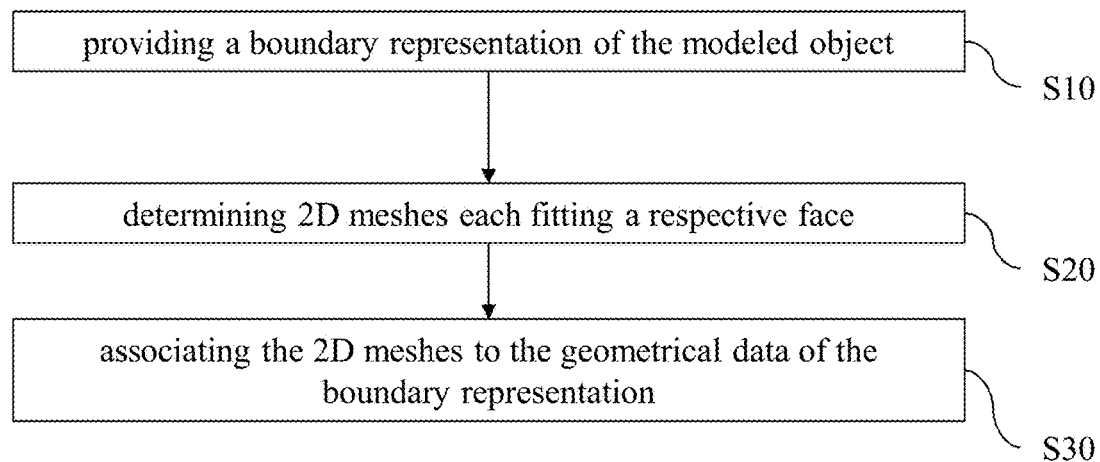
FIG. 5 shows a flowchart of an example of the method.

FIG. 5 shows a flowchart of an example of the computer-implemented method for parameterizing a three-dimensional modeled object for tessellation. The method comprises the step of providing S10 a boundary representation of the modeled object. The boundary representation comprises both geometrical data and topological data. The geometrical data include parametric surfaces. The topological data include a set of faces. Each face is defined as a portion of the 2D domain of a respective parametric surface. The method also comprises the step of determining S20 2D meshes each fitting a respective face. And the method also comprises the step of associating S30 the 2D meshes to the geometrical data of the boundary representation.

Such a method improves the tessellation of a 3D modeled object. The parameterizing of the modeled object before the tessellation allows a faster tessellation, relatively to the case that the tessellation is performed from the raw data constituting the boundary representation. Because the 2D meshes are associated to the geometrical data, the tessellation can be performed at any time, and at any level of accuracy by simple subdivisions of 2D meshes, as will be explained later. And since the tessellation may be performed fast from the 2D meshes and the geometrical data, the tessellated 3D meshes need not necessarily be kept in memory. Also, the topological data may be discarded, at least partly, thereby allowing a gain of memory (in case such information is not needed anymore for the contemplated application, such as rendering or geometric operators), without losing the possibility to reach any level of accuracy. Furthermore, the tessellation may comprise the determination of accurate normal vectors from the geometric data at any time, which may prove useful in the case the contemplated application includes rendering and surface shading.

The method may be for the purpose of designing a 3D modeled object, e.g. that represents a part (e.g. a mechanical part). The parameterization of the three-dimensional modeled object allows its later tessellation. The tessellation may then be used for the rendering of the modeled object, for example for displaying the modeled object, and/or for applying geometric or Boolean operators. Such tessellation may actually follow the method, as discussed later. The rendering, possibly followed by the displaying, or the application of an operator may then follow the tessellation.

A modeled object is any object defined by data stored on a memory of a computer system. By extension, the expression "modeled object" designates the data itself "Designing a 3D modeled object" designates any action or series of actions which is at least part of a process of elaborating a 3D modeled object. Thus, the designing may comprise creating a 3D modeled object from scratch. Alternatively, the designing may comprise providing a 3D modeled object previously created, and then modifying the 3D modeled object.

The 3D modeled object may be a CAD modeled object or a part of a CAD modeled object. In any case, the 3D modeled object contemplated by the method (i.e. the modeled object of which a B-Rep is provided at S10) may represent the CAD modeled object or at least part of it. A CAD modeled object is any object defined by data stored in a memory of a CAD system. According to the type of the system, the modeled objects may be defined by different kinds of data. A CAD system is any system suitable at least for designing a modeled object on the basis of a graphical representation of the modeled object, such as CATIA. Thus, the data defining a CAD modeled object comprise data allowing the representation of the modeled object (e.g. geometric data).

The method may be included in a manufacturing process, which may comprise, after performing the method, producing a physical product corresponding to the modeled object. In any case, the modeled object contemplated by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process. The method can be implemented using a CAM system. A CAM system is any system suitable at least for defining, simulating and controlling manufacturing processes and operations.

The method is computer-implemented. This means that the method is executed on at least one computer or any system alike (i.e. with a processing unit and a memory). For example, the method may be implemented on a CAD system. Thus, steps of the method are performed by the computer, possibly fully automatically, or, semi-automatically (e.g. the method being triggered by the user or involving the user for some steps).

A typical example of computer-implementation of the method is to perform the method with a system suitable for this purpose. The system may comprise a memory having recorded thereon instructions for performing the method. In other words, software is already ready on the memory for immediate use. The system is thus suitable/adapted for performing the method without installing any other software. Such a system may also comprise at least one processor coupled with the memory for executing the instructions. In other words, the system comprises instructions coded on a memory coupled to the processor, the instructions providing means for performing the method. The processor may comprise a GPU and/or a CPU.

Such a system may be a CAD system, with a graphical user interface to which the processor is coupled. The system may also be a CAE and/or CAM system, and the CAD modeled object may also be a CAE modeled object and/or a CAM modeled object. Indeed, CAD, CAE and CAM systems are not exclusive one of the other, as a modeled object may be defined by data corresponding to any combination of these systems.

The contemplated modeled object is 3D (i.e. three-dimensional). This means that the modeled object is defined by data allowing its 3D representation. A 3D representation allows the viewing of the representation from all angles. For example, the modeled object, when 3D represented, may be handled and turned around any of its axes, or around any axis in the screen on which the representation is displayed. This notably excludes 2D icons, which are not 3D modeled, even when they represent something in a 2D perspective. The display of a 3D representation facilitates design (i.e. increases the speed at which designers statistically accomplish their task). This speeds up the manufacturing process in the industry, as the design of the products is part of the manufacturing process.

Figure 6:
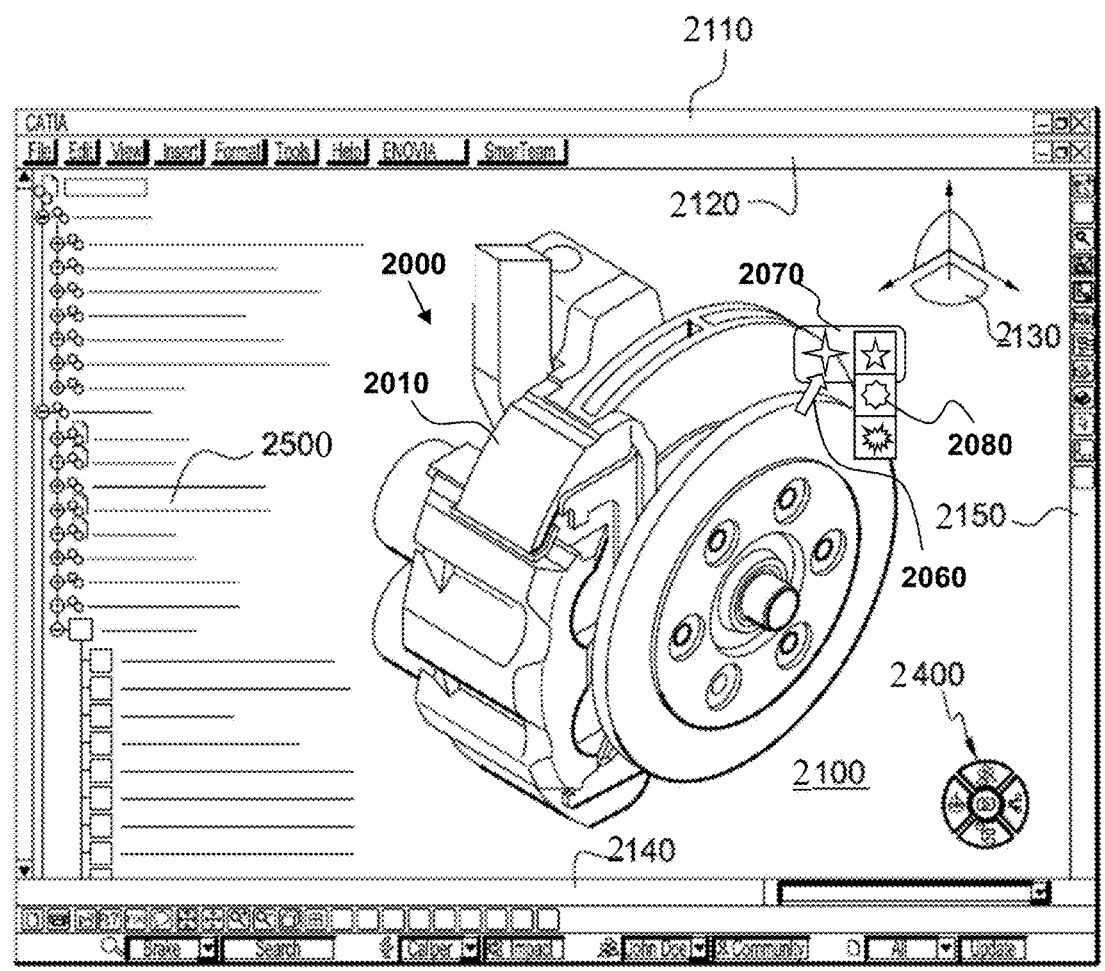
FIG. 6 shows an example of a graphical user interface.

FIG. 6 shows an example of the GUI of a typical CAD system, displaying a 3D modeled object 2000 e.g. after it has been parameterized by the method and then actually tessellated and then rendered.

The GUI 2100 may be a typical CAD-like interface, having standard menu bars 2110, 2120, as well as bottom and side toolbars 2140, 2150. Such menu and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. a sculpting operation, or any other operation such as a change of the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 6, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

FIG. 7 shows an example of the architecture of the system as a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphics processing unit (GPU) 1110 which is associated with a video random access memory 1100 connected to the BUS. The method may be performed by CPU 1010 and/or GPU 1110. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer also comprises graphical user interface 1080 for the physical designer to trigger the method and interact with the system in order to perform the method, or for later actions such as designing the modeled object.

To cause the system to perform the method, it is provided a computer program comprising instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing CAD system to a state wherein the system is suitable for performing the method.

The method is for parameterizing a 3D modeled object for tessellation. This means that the method provides a step towards tessellation, i.e. the method makes a preparation for tessellation. As a result, tessellation is performed faster than from scratch. It has to be noted that the 3D modeled object is handled as computer data, e.g. a computer data file, that may be stored on non-volatile memory. This is known from the field of CAD, and more generally, from the field of computer science. Thus, parameterizing the 3D modeled object for tessellation may "transform" (or at least create a copy of a transformed version of) the modeled object. The initial format provided at S10 comprises a boundary representation, and the method results in a parameterized version being stored as computer data having a specific format e.g. on non-volatile (or persistent) memory. The final format resulting from the method comprises 2D meshes associated to the geometrical data of the boundary representation. Thus, the method may create a data file with a new format (i.e. the abovementioned "final format"), and the method may store such file under such format, e.g. on non-volatile memory, so that it can be sent to another computer or used later. Notably, this data file with a new format may be used for tessellation.

The providing S10 may result from a designer working on a modeled object (and thus on its boundary representation), or from the fact that the method may be applied to already existing B-Reps, e.g. retrieved in existing libraries. The modeled object is in any case provided at S10 as a B-Rep. The boundary representation is a widely known format for modeling a 3D object in terms of its envelop (i.e. its outer surfaces). The B-Rep comprises geometrical data and topological data. Geometrical data are data that provide geometrical entities, which are entities described in terms of 3D positions. Topological data are data that provide topological entities, which are entities described in terms of references to geometrical entities and/or relationships with other topological entities, e.g. relative positioning. Typically, the relationships may include an "is bounded by" relationship that associates a topological entity to other topological entities by which they are topologically bounded. In the case of the method, the geometrical data include at least parametric surfaces (i.e. 3D surfaces modeled in terms of 3D positions associated to parameters defining a 2D domain). Parametric surfaces may typically be Nurbs surfaces, but also planar, canonical or procedural surfaces. And the topological data include at least a set of faces, each face being defined as a portion of the 2D domain of a respective parametric surface (provided in the geometrical data), e.g. in an indirect way as described in the following. Thus, a face corresponds to a trimmed surface.

The notion of B-Rep, although widely known, is now further discussed through an example in order to extensively describe the method. Other examples with relationships different from the "is bounded by" relationship for at least some topological entities may however be contemplated by the method.

As already mentioned, a B-Rep of a modeled object includes topological entities and geometrical entities.

The geometrical entities may comprise 3D objects that are surfaces (e.g. planes), curves (e.g. lines) and/or points. Surfaces may be provided as functions of two parameters. Curves may simply be provided as functions of one parameter. And points may be provided as 3D positions.

The topological entities may comprise faces, edges, and/or vertices. By its definition, a face corresponds to a bounded portion of a surface, named e.g. the supporting surface. The term "face" may thus indifferently designate such bounded portion of the surface or the corresponding bounded portion of the 2D domain. Similarly, an edge corresponds to a bounded portion of a curve, named e.g. the supporting curve. The term "edge" may thus designate such bounded portion of the curve or of its domain. A vertex may be defined as a link to a point in 3D space. These entities are related to each other as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Surfaces, curves, and points may be linked together via their parameterization. For example, a value of the parameter of the parametric function defining a curve may be provided to define a bounding vertex. Similarly, a function linking the parameter of a curve to the two parameters of a surface may be provided to define a bounding edge. However, the very detailed structure of such topological data of a B-Rep is out of the scope of the present explanations.

FIGS. 8 and 9 illustrate the B-rep model of a cylindrical slot 80 made of three faces numbered 1, 2 and 3 on the figures: top planar face 1 and two lateral cylindrical faces 2 and 3. FIG. 8 shows a perspective view of slot 80. FIG. 9 shows the exploded view of all faces. Duplicated numbers illustrate edges and vertices sharing. Face 1 is a bounded portion of a plane. Boundary of face 1 includes edges 4 and 5, each of them being bounded by vertices 10 and 11. They both have the same supporting circle. Face 2 is bounded by edges 6, 8, 5 and 13 all lying on an infinite cylindrical surface. Faces 1 and 2 are adjacent because they share edge 5. Faces 2 and 3 are adjacent because they share edges 8 and 13. Faces 1 and 3 are adjacent because they share edge 4.

FIG. 10 illustrates the "is bounded by" topological relationship of the B-rep model of slot 80. Nodes of higher layer 101 are faces, nodes of intermediate layer 103 are edges and nodes of lower layer 105 are vertices. FIGS. 11 and 12 illustrate the relationship between topological entities (faces, edges, vertices) and the supporting geometries (infinite cylinder, infinite plane, infinite line, points). In the CAD system, the B-rep model gathers in an appropriate data structure the "is bounded by" relationship and the relationship between topological entities and supporting geometries (this is the topological data), and mathematical descriptions of supporting geometries (this is the geometrical data). In other words, the data structures shown on FIGS. 10 and 11 are part of the topological data of this example, which comprise links to geometrical entities of the geometrical data (this is FIG. 11) and links between topological entities (this is FIG. 10).

The determining S20 of 2D meshes each fitting a respective face is now discussed. In the geometrical data, parametric surfaces are defined as 3D positions associated to a 2D domain (with two parameters, generally noted u and v). As already discussed, a face corresponds to a bounded portion of a respective parametric surface, and may thus be (e.g. indirectly, through all the topological data) defined, for example according to the format shown with reference to FIGS. 8-12, as a portion of the 2D domain of a respective parametric surface. In any case, such portion of the 2D domain of a respective parametric surface is fitted (i.e. covered) by a respective 2D mesh. A 2D mesh is a planar mesh (i.e. all vertices and edges of the mesh are on a plane). A mesh is, as it is widely known, a regular network of vertices joined by edges, which may be restricted to straight segments. The 2D meshes may typically be triangular meshes or quad meshes. Examples of the determining S20 are provided later, but it is here noted that the fitting may be only approximate. For example, each 2D mesh may fit a respective face with a total area tolerance error inferior to 10%, or 5%.

The 2D meshes may then be associated S30 to the geometrical data of the B-Rep. As a result, (all or at least a part of) the topological data may be discarded. For example, the geometrical data together with the 2D meshes associated to said geometrical data may be stored on non-volatile memory or sent to another computer system, e.g. to another user.

The associating S30 creates links (which are in fine part of the data outputted by the method) between the 2D meshes and entities of the geometrical data. The 2D meshes may for example be each associated to at least a respective parametric surface, each given 2D mesh being associated to the parametric surface of whose 2D domain the face (that the given 2D mesh fits) is a portion of. (Also, as discussed later, the 2D meshes, in particular some specific vertices of the 2D meshes, may be associated to other geometrical entities such as curves.)

As a consequence, tessellation may be performed fast, e.g. by transforming the 2D meshes in 3D meshes directly usable by the GPU of the computer system. Indeed, the mesh structure being already determined at S20, only a one-to-one modification of positions of vertices, from 2D to 3D, is necessary to obtain the tessellation of the modeled object. The tessellation may thus be performed fast.

For this reason, it is also proposed a computer-implemented method for tessellating a three-dimensional modeled object (already) parameterized for tessellation. Such a method for tessellation may comprise a step of providing 2D meshes associated to geometrical data of a B-Rep of the modeled object according to the above method for parameterizing. Such 2D meshes may be provided by actually performing the method for parameterizing, as represented by step S40 on FIG. 13, which shows an example of the method for tessellation. But such 2D meshes may also be provided as such (for example if the method for parameterizing, or another method resulting in the same data structure, has been performed at an earlier time, possibly on another computer system).

Figure 13:
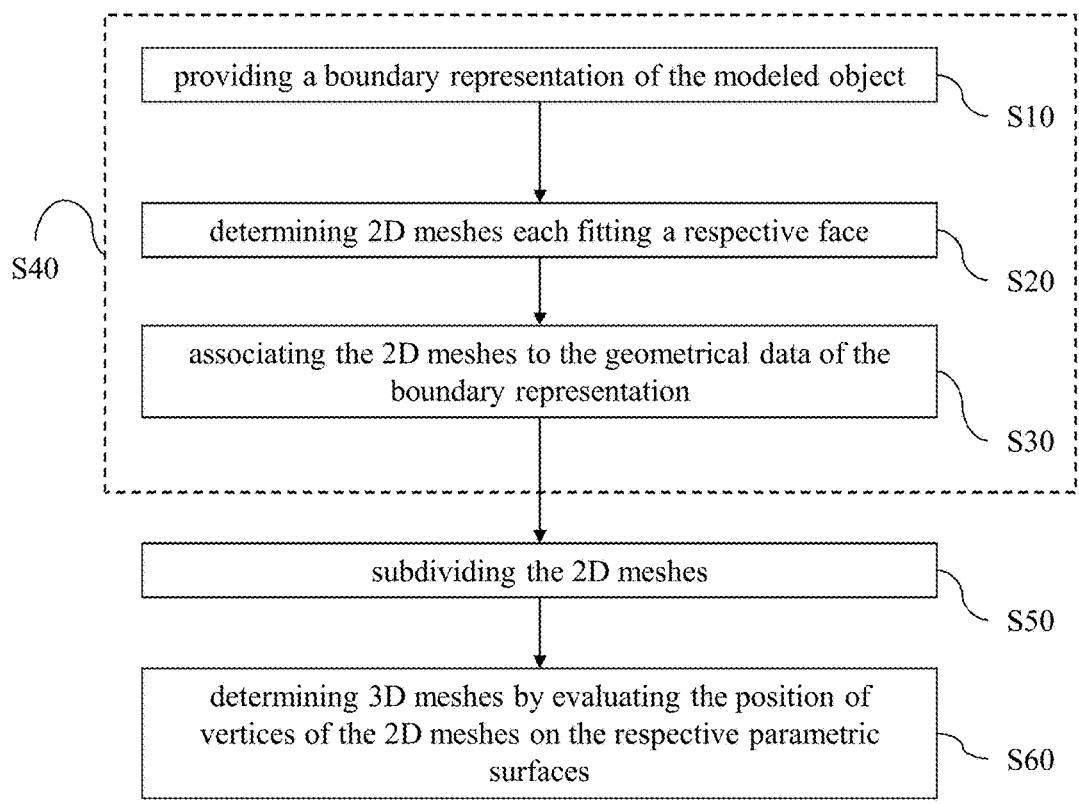
FIG. 13 shows an example of a method for tessellation.

As also shown on FIG. 13, the method for tessellation may then comprise determining S60 3D meshes by evaluating the position of vertices of the 2D meshes on the respective parametric surfaces. The determining S60 may determine one 3D mesh per 2D mesh, keeping each time the mesh structure. The 3D meshes may then possibly be sewn together in any way. As the 2D meshes fit a portion of the 2D domain of a respective parametric surface, vertices of each 2D mesh are defined on the 2D domain of a respective parametric surface. Thus, for each 2D mesh, the evaluation of the determining S60 may associate values to the u and v parameters of the 2D domain of the respective parametric surface, corresponding to the vertices of the 2D mesh, and then determines the corresponding 3D position, according to the definition of the 3D parametric surface. In other words, the determination S60 may comprise applying the parametric function defining the parametric surface to the parameters corresponding to the vertices of the 2D meshes. For example, the geometric data of the boundary representation comprise functions of the type $S(u,v)=(x(u,v),y(u,v),z(u,v))$ for each parametric surface. The evaluating may then comprise applying function S to the values of u and v retained for vertices of the 2D meshes. This evaluation may thus be performed fast, and the determining S60 may keep the data structure of the 2D meshes, by keeping track of edges between vertices of the 2D meshes and transposing them into edges between vertices of corresponding 3D meshes.

As shown on FIG. 13, the method for tessellating may further comprise subdividing S50 the 2D meshes before determining S60 the 3D meshes. This allows a refinement of the 3D meshes obtained in fine, and this increases accuracy of the tessellation on-demand. As the evaluation of the determining S60 is then performed based on the exact information, in other words on the parametric surface, any required level of accuracy can be reached. Also, as the 2D meshes have a mesh structure, classic mesh subdivision schemes, e.g Catmull-Clark or Loop respectively for quad meshes or triangular meshes, may be used. Leaving such subdivision S50 for later allows to increase the speed of the determination S60 when high accuracy is not required, and also to have a relatively low memory consumption of the parameterization.

The method may further comprise associating to the 3D meshes normal vectors computed based on their respective parametric surfaces. In other words, the result of the tessellation comprises not only the 3D meshes with vertices positions and facets bounded by edges, but also normal vectors linked to any of such elements. As the normal vectors may be computed based on the (exact) parametric surfaces, they represent accurate normals of the modeled object. The tessellated model may thus be accurately shaded.

The methods thus provide a way for tessellating dynamically trimmed parametric surfaces with high precision position and normal meshes, combining 2D partition (i.e. the 2D meshes) of the trimmed parametric surfaces and exact evaluation on these surfaces. The first problem is solved by computing fine-grained geometry directly on the set of input parametric surfaces. Normals are no longer being approximated through quadratic interpolation. They may now be computed from surface definition. Maintaining several representations is not needed anymore. The methods need only one 2D partition which is lighter than the background art and could produce any kind of representation with a much higher accuracy. Stitching trimmed surfaces may be done using e.g. a 2D Bezier partition and closure curves on trimmed surfaces boundaries. A first advantageous effect is the geometry quality improvement. Using trimmed surfaces ensures independence of each surface which could take advantage of a parallel architecture. Each one could be tessellated and evaluated independently. In other words, the determining S20, the associating S30, the subdividing S50, and/or the determining S60 may be executed in parallel taking advantage of the parallel processing ability of the GPU.

Examples of the methods will now be discussed with reference to FIGS. 14-40.

FIG. 14 shows an example of a boundary representation of a modeled object 140, provided at S10. Modeled object 140, provided as a B-Rep, is thus the input of the process of the example. B-Rep 140 comprises a collection faces, i.e. portions of the domain of parametric surfaces, corresponding to trimmed parametric surfaces 142 connected each to the others through boundary curves 144. One of these trimmed parametric surfaces 146 is now discussed with reference to FIGS. 15 and 16. FIG. 15 shows trimmed parametric surface 146. FIG. 16 shows the supporting parametric surface 148 of trimmed surface 146. In fact, the B-Rep of the modeled object of the example may comprise, as its constituting geometrical data, a 2D parameterization of supporting surface 148, e.g. a function S(u,v) as mentioned above and defined for a certain domain, a parameterization of curves 164, e.g. a function C(s)=(x(s),y(s),z(s)), possibly with a linkage between s and (u,v), and 3D positions for points 162. The B-Rep may then comprise within topological data relationships as shown on FIGS. 10-11 introducing vertices, edges and faces pointing to the geometrical entities and defining relations between vertices, edges and faces. Trimmed surface 146 may thus be brought to a portion of the domain of parametric surface 148, said portion thus defining a face (reference 146 being indifferently designated as "face 146" or "trimmed surface 146" in the following).

Determining S20 the 2D meshes may comprise, for each respective face subdividing boundary edges of the respective face into parametric arcs. A face is a portion of the 2D domain of a surface which may thus be a planar surface bounded by planar curves. These curves define edges of the topological data, which are those that bound the considered face within the "is bounded by" relationship of the B-Rep discussed earlier. The determining S20 comprises subdividing (i.e. partitioning) such edges (i.e. the planar curves) into portions, which may be at least approximated by a parameterization and thus be defined as parametric arcs. The parametric arcs may be Bézier arcs. The determining S20 may also comprise defining a set of vertices within the respective face, e.g. in parallel to the subdividing of the edges. The vertices are points defined on the portion of the 2D domain of the respective parametric surface defining the face. The vertices may be defined by imprinting a (e.g. regular) grid of vertices on the portion (i.e. by detecting the intersection of the grid with the portion). The determining S20 may then comprise determining a partition of the respective face with parametric patches (i.e. elementary surfaces) bounded by (i.e. connected at boundaries to) the parametric arcs and the vertices of the set of vertices. The parametric patches may be Bézier patches, e.g. including triangular and/or quad patches. At this point, each respective face (i.e. each respective portion of the 2D domain of a trimmed parametric surface) is (e.g. approximately) fitted with a set parametric patches.

The idea in this example is thus to create a pre-computed 2D partition of a trimmed surface in its parametric domain (2D coordinate's u and v). This partition may generally be constituted by 2D triangular or rectangular Bezier patches, called 2D partition patch. The Bezier patches can be of different degrees, but cubic Bezier patches may be used for good results. Moreover, the cubic Bezier patches may be computed from 2D positions and possibly 2D tangents. Such information may come from the subdivision process of boundary edges. In addition inner subdivision vertices can be equally used to reach the input chord deviation and/or to avoid inversion while refining Bezier patches.

In order to avoid inversion notably, the parametric patches of the partition may each have boundary arcs that do not cross oneself. In other words, the parametric patches are determined among the class of parametric patches having boundary curves (i.e. the boundary arcs) that do not loop. Also, for a final result respecting the initial topology of the trimmed surface, the parametric patches of the partition may each have boundary arcs that do not cross each other. In other words, another constraint imposed on the process may be to avoid having two parametric patch boundary arcs (potentially belonging to the same patch) cross each other.

For this reason, the subdivision of boundary edges of the respective face into parametric arcs may be fine enough to avoid such crossings. In other words, the subdivision of boundary edges is performed until no boundary arcs cross each other, because the subdivision introduces a number of parametric arcs high enough to approximate the boundary edges well enough in order to avoid crossings due to the error possibly introduced by the approximation. Also, the parametric patch may be constructed to avoid inner inversion, i.e. the control points of the parametric patch are regular, inner control points are not across the boundary arcs of the parametric patch, nor inverted one relatively to the other. The skilled person may thus adapt the method in any known way so that it respects any or all of these constraints.

The expression of a 2D triangular Bezier patch is:

$$b(s,t) = \sum_{i+j+k=3} b_{ijk} \frac{3!}{i!j!k!} s^i t^j (1-s-t)^k$$

Figure 17:
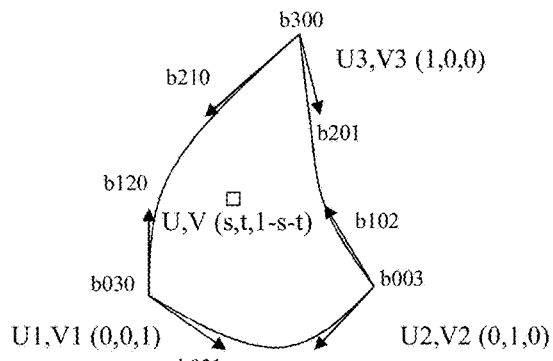

FIG. 17 shows such a 2D triangular Bezier patch.

The expression of a 2D rectangular Bezier patch expression is:

$$p(s,t) = \Sigma_{i=0}^3 \Sigma_{j=0}^3 P_{ij} B_i^3(s) B_j^3(t)$$

Figure 18:
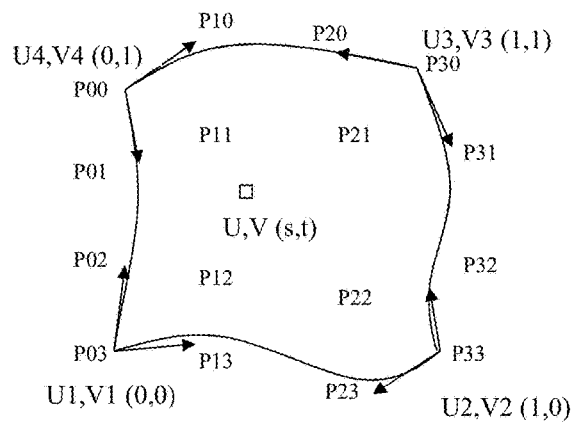

FIG. 18 shows such a 2D rectangular Bezier patch.

Figure 19:
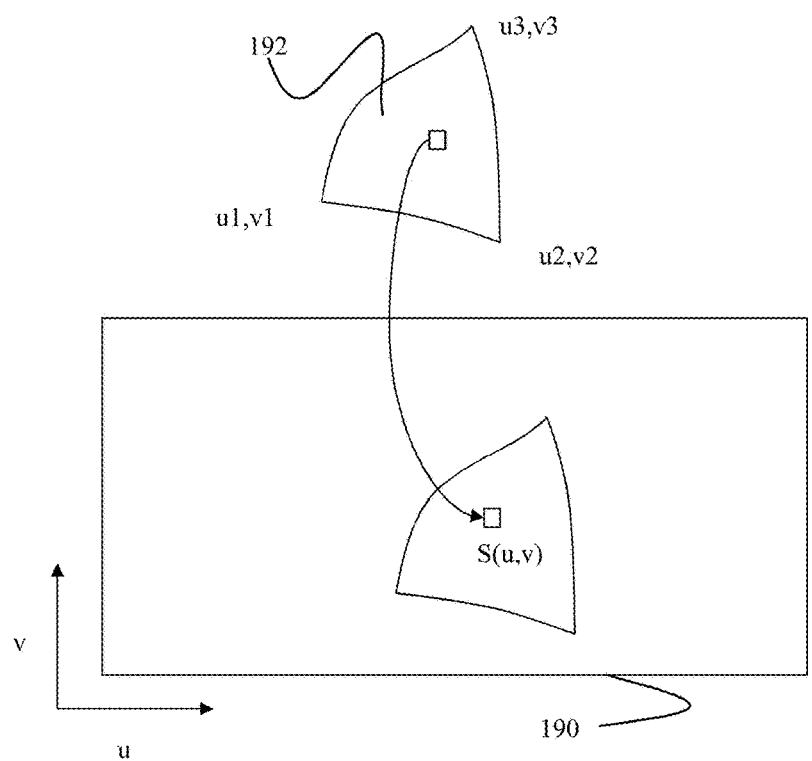

FIG. 19 illustrates the determining S60 of 3D meshes by schematically showing the evaluation of the position of vertices of the 2D meshes on the respective parametric surfaces. FIG. 19 shows the exact evaluation S(u,v) on the parametric surface 190 after computing the inner u,v points with the 2D Bezier patch 192.

Once the 2D partition of the face is constructed, a dynamic tessellation of the face can be performed by applying refinement patterns (i.e. the subdivision S50) for each 2D partition patch. This may comprise retrieving 2D coordinates (u and v) of the refinement points and then evaluating the 3D position and normals through the equation of the face support (i.e. parametric surface).

Figure 20:
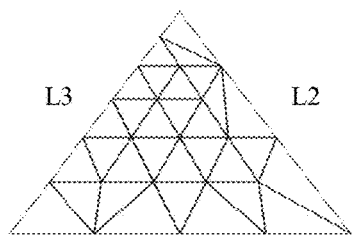
Figure 21:
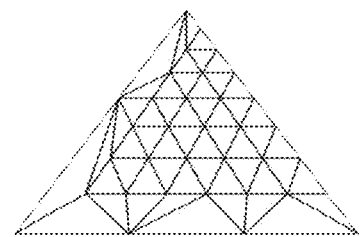
Figure 22:
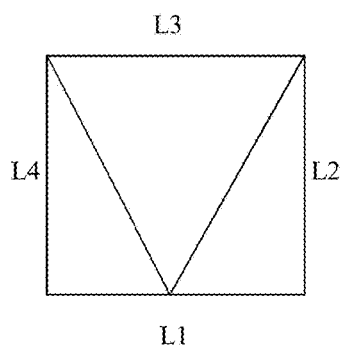
Figure 23:
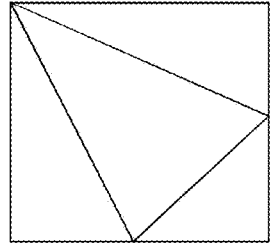
Figure 24:
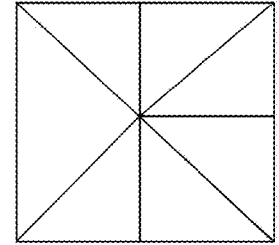

FIGS. 20-21 show examples of refinement patterns for triangular patterns, with refinement level L on each side. FIGS. 22-24 show examples of refinement patterns for rectangular patterns, with refinement level L on each side. These refinement patterns may be followed for performing the subdivision S50 and/or the subdivision following the partitioning of the face with parametric patches (the latter being discussed later). For each partition patch, the refinement pattern may be selected from available pre-computed refinement patterns. The selection function may be application-dependent (e.g. view point or zoom level). Also, the selection function may depend on a maximal deviation constraint (discussed later).

Figure 25:
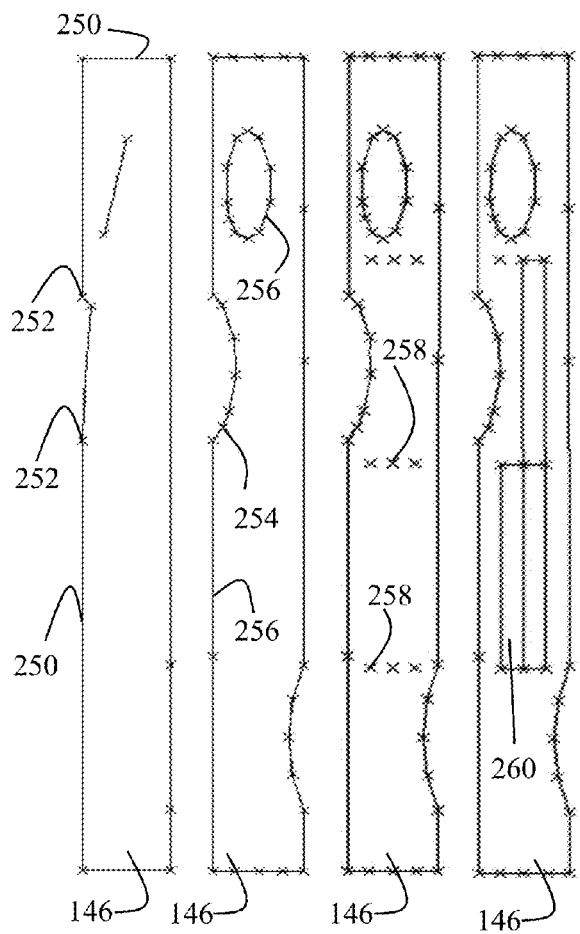
Figure 26:
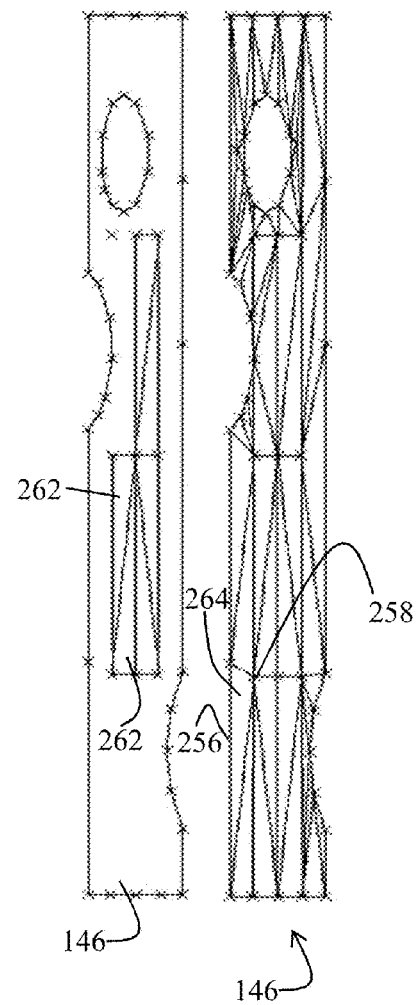

FIG. 25 illustrates the above discussions by showing how the determining S20 is performed for face 146. From the left to the right, FIG. 25 first shows face 146 provided with its boundary edges 250 (which are between the boundary vertices 252 represented by crosses). Second, the boundary edges are subdivided (additional vertices 254 are added and the boundary edges are approximated by parametric arcs 256). Thirdly, the determining S20 comprises defining a set of vertices 258 within face 146. Contrary to vertices 254 that bound parametric arcs 256, vertices 258 lie well within face 146. Fourth, the determining S20 starts determining a partition of the respective face with parametric patches bounded by the parametric arcs and the vertices of the set of vertices by adding quad patches 260 bounded by vertices 258. Then, as shown on FIG. 26, the determining may cut quad patches 160 into two triangular patches 262 (thus bounded by vertices 258) and then add triangular patches 264 bounded by both vertices 258 and parametric arcs 256. Of course, the final addition of parametric patches 262, 264 may be performed differently. For example, the resulting parametric patches may comprise quad (i.e. rectangular) patches only, or a combination of quad patches and triangular patches (for example quad patches 260 may be not divided in two and remain rectangular). In any case, the respective face is covered with parametric patches that are bounded (i.e. limited at extremities such as boundary edges or boundary vertices of the patches) by elements previously created including interior vertices and parametric arcs.

The partition may be used as such to produce the tessellated model, at S40. In other words, the partition with 2D parametric patches constitutes the 2D meshes with which the determining S60 may be performed. However, as already briefly mentioned above with reference to FIG. 13, the partition may then be refined, or subdivided S50, by any means, in order to achieve a higher accuracy of the final tessellated model. The subdivision S50 may occur when performing the tessellation. However, a part of the subdivision may be performed beforehand (i.e. while producing the parameterized model), in order to spare some time when performing the tessellation. In other words, determining S20 the 2D meshes may further comprise, for each respective face, subdividing the partition. This may be performed according to refinement patterns as described above. This specific subdivision may be performed according to different criteria. One criterion may be a maximal deviation (condition) between the 3D meshes and the respective parametric surfaces. Indeed, the subdivision of the partition is performed with the view that the tessellated model comprises enough flat polygons so that the deviation from the exact surfaces is inferior to a maximal value, e.g. predetermined. Another criterion may be a maximal number of times for further subdividing S50 the 2D meshes before the step of determining S60. In other words, the user may impose to the method of parameterizing that, when the tessellation will actually be performed later (with the determining S60), a deviation inferior to a certain (e.g. predetermined) maximum value (i.e. the maximal deviation) should be reached by performing a number of subdivision (the subdividing S50) inferior or equal to a certain maximal value (i.e. the maximal number of times), e.g. also predetermined. Yet in other words, the 2D meshes are provided such that an accurate enough tessellation may be achieved in a fast enough way (e.g. with a number of subdivisions S50 low enough), e.g. the levels of accuracy and speed being pre-defined, e.g. by the user.

Examples of the parameterization and the tessellation with trimmed NURBS surfaces are now discussed.

In these examples, the evaluation of the parametric surfaces is done using a General Purpose Graphic Processor Unit (i.e. GPGPU). The method for tessellation thus uses highly parallel resource, that is the Graphic Processor Unit (i.e. GPU) to do the computation in cooperation with the traditional Computer Processor Unit (i.e. CPU). This technology ensures a huge computation speedup resulting in a very efficient pipeline. Moreover, geometry is stored on GPU memory that could be directly displayed.

Figure 27:
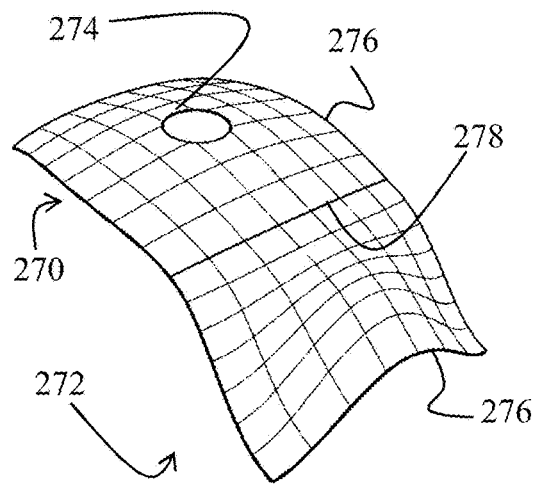
Figure 28:
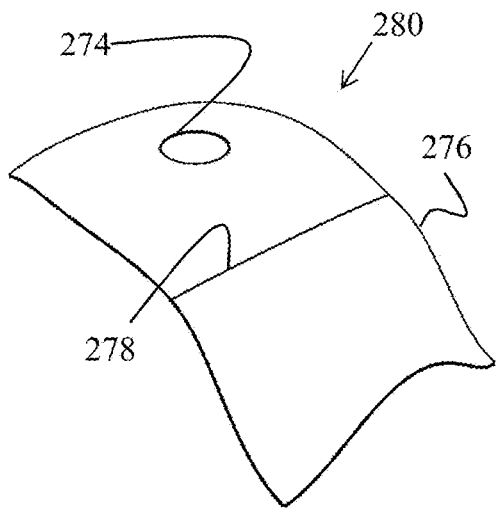

The first step is to gather all NURBS curves and surfaces which are part of the B-Rep. This could be a very complex set of surfaces with operations between them, such as, trim, bevel, and/or fillet. The B-Rep thus gives a skeleton model with boundary condition. For example, FIGS. 27-28 illustrate two NURBS surfaces 270 and 272 linked with a C2 constraint on curve 278. A trim operation may be defined by a circle 274 on surface 270. On FIG. 27, the two NURBS surfaces 270 and 272 are bounded by NURBS curves 276. On FIG. 28, the skeleton 280 containing boundary curves 274, 276 and 278 is shown. This is the input model of the parameterization provided at S10. This B-Rep may be stored on the GPU in a contiguous model. The whole data with the surface and curve definitions may be copied, including elements such as control points, orders, knot vectors (i.e. the geometrical data), and/or boundary information (i.e. the topological data).

Figure 29:
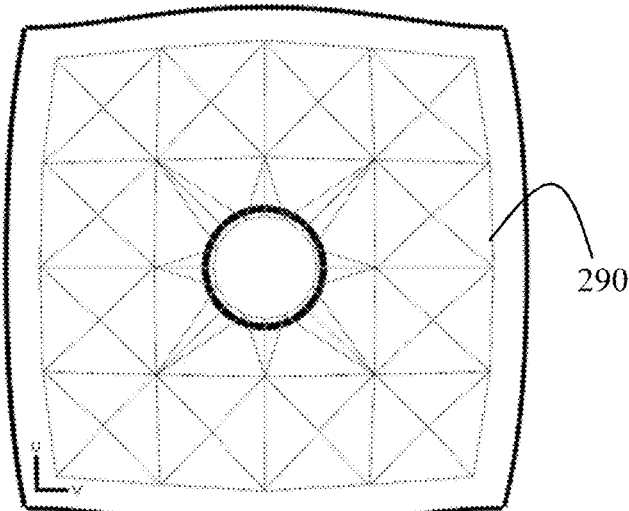

Next, as shown on FIG. 29 which shows a parametric mesh 290 defined on the 2D domain 292 in u and v coordinates of surface 270 (with an offset represented between parametric mesh 290 and domain 292 for the purpose of clarity), skeleton 280 is parameterized e.g. according to the method for parameterization, producing a coarse-grained 2D parametric hull for each curve and surface. The parameterization can be seen as such a 2D mesh 290 for each respective surface, associated to the geometrical data. A set of 2D triangles is defined for each surface, and, similarly a set of 2D segments may be defined for each boundary curve. Thus, parametric points may be evaluated to generate a representation of a surface. The parameterization may then be copied to the GPU for the GPU to have all input data to work with.

For each pair of faces having a common boundary edge, the 2D meshes may be determined at S20 to share the same vertices fitting the common boundary edge.

As already explained, the faces are defined as a portion of the 2D domain of a respective parametric surface. Two faces of a pair of faces are said to have a common boundary edge if the respective trimmed parametric surfaces that they correspond to have a common boundary curve. Referring back to the example of FIG. 27, this is the case for trimmed surfaces 270 and 272 that are commonly bounded by curve 278. In fact, such common 3D boundary curve is defined as two 2D curves respectively delimiting the 2D domain of each of the two respective parametric surfaces. Indeed, each face being defined as a portion the 2D domain of a respective parametric surface, the portion has each time one boundary 2D curve that corresponds to the common 3D boundary curve. These boundary 2D curves form the so-called "common boundary edge" of the two faces.

This boundary edge may be fitted at S20 with the same vertices for each of the two 2D meshes fitting the two faces. This means that the two 2D meshes fitting each respective face of the pair, have vertices dedicated to fit the common boundary edge. These may be obtained by subdividing the common boundary edge of the two faces into parametric arcs, as explained above. Moreover, these vertices are the "same" for the two 2D meshes, meaning that they correspond to the same 3D position on the B-Rep. If the common boundary edge of the two faces is subdivided as explained above, this means that the subdivision leads to the same result in both cases. Of course, the skilled person knows how to ensure that the vertices of both 2D meshes correspond to the same 3D position although the supporting parametric surface may be different, e.g. through an adequate parameterization.

This avoids cracks on borders between adjacent partition patches, and this allows that identical tessellation of the shared border may be performed (the tessellation may evaluate only one set of 3D points for each edge). This can for example be achieved by selecting a pattern based on each border's tessellation degree.

Notably, the geometrical data may include parametric curves representing intersections between the parametric surfaces. In this case, as explained above, the faces of the boundary representation may each have boundary edges, and each boundary edge may be defined as a portion of the domain of a respective parametric curve. In such a case, the determining S60 if the 3D meshes may further comprise evaluating the position of vertices of the 2D meshes fitting the boundary edges on the respective parametric curves. Notably, the associating S30 may associate such vertices to these parametric curves (instead of a parametric surface). This allows a more accurate evaluation of the boundaries between the trimmed surfaces when performing the tessellation.

Figure 30:
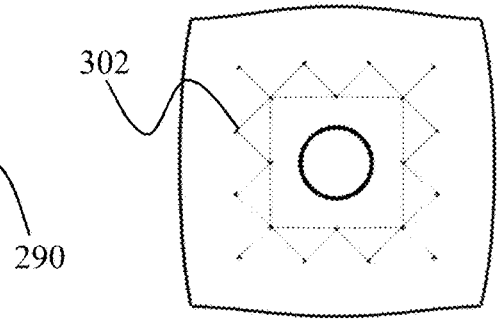
Figure 31:
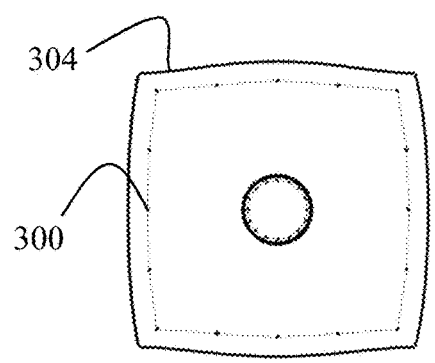

Referring to FIGS. 30-31 which relates to the example of FIGS. 27-29, boundary points 300 of 2D mesh 290 (of FIG. 29) may be mapped on (i.e. associated to) boundary NURBS curves (corresponding to edges 304) with the same parameterization as NURBS curves defining tensor product. Thus, interior vertices 302 may be evaluated on surfaces and boundary vertices on curves.

Examples of the subdivision of the 2D meshes performed at S50 are now discussed with reference to the example of NURBS.

The parameterization output should be fine-grained enough to ensure a final 3D mesh dense enough. The parameterization should ensure that the result respects user tolerance. For that, the first 2D partition of the faces may be subdivided in order to have enough geometry, as discussed above. Then coarse-grained parameterization from the tessellation is refined to a fine-grained parameterization. As GPU process is fast enough, a more dense geometry may be generated for NURBS surface evaluation and provides a high accuracy mesh. Of course it depends on the application and it may be up to the user to predetermine how subdivision S50 shall be performed.

Figure 32:
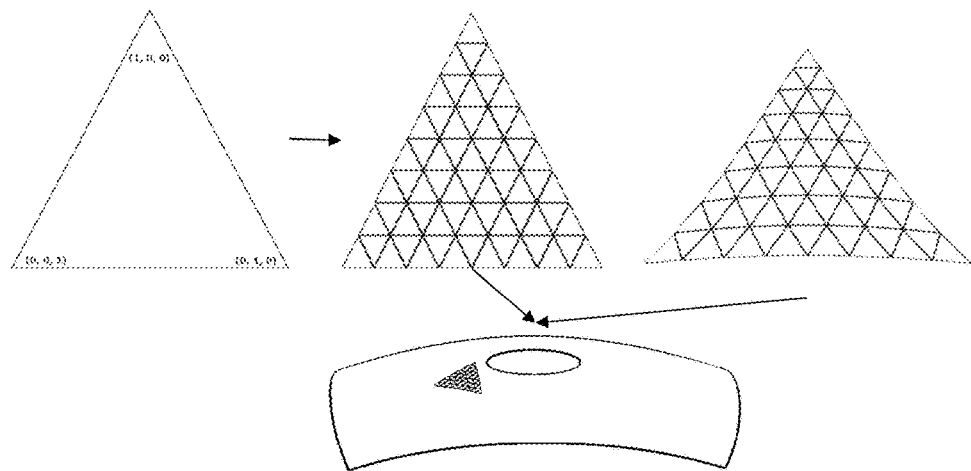
Figure 33:
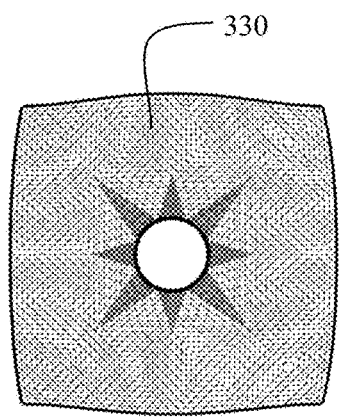

As shown on FIG. 32, a coarse triangle may be expressed using barycentric coordinates (u, v, w). Refinement is done using a pattern defining a set of barycentric coordinates according to each split on triangle edges. For example one triangle could be subdivided into 64 triangles or more. Barycentric coordinates are then transformed to the NURBS surface domain in order to be further evaluated. Starting from the partition of FIG. 29, this leads to the 2D mesh 330 of FIG. 33.

Using GPGPU brings to process parametric points in an independent way as computation is done in parallel. Each point may be evaluated independently of the surface or the curve that it is associated to. Consequently, mapping information must be kept to ensure the same evaluation for boundary parametric points at surfaces seam. If not there may be cracks between two adjacent trimmed surfaces.

To avoid cracks between surfaces, boundary surfaces points may be evaluated on the NURBS curves lying on two surfaces. A mapping may be preserved in order to evaluate a parametric point either on a NURBS curve or on a NURBS surface.

Figure 34:
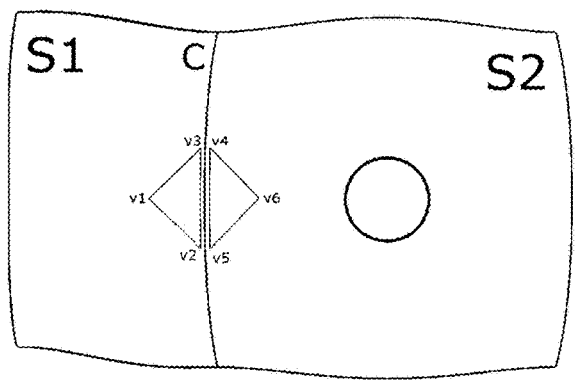

Moreover, parametric points sharing the same curve may be evaluated with the same parameter. FIG. 34 shows the case which could be quite restricting. Two NURBS surfaces S1 and S2 are in this example joined by the NURBS curve C. Each one has a parametric triangle (v1, v2, v3) and (v4, v5, v6) to evaluate. Boundary vertices v3, v4, v2 and v5 may be evaluated on C, v1 on S1 and v6 on S2. Mapping ensures that both v3 and v4 will be evaluated at the same parameter t1 on C and so for v2 and v5 at t2 on C.

Finally when 2D partition is refined with boundary conditions, the GPGPU algorithm evaluate all 2D points on curves and surfaces in parallel from previously stored curves and surfaces definition. Triangles vertices and normals are stored on GPU memory and surfaces could be displayed ahead.

Figure 35:
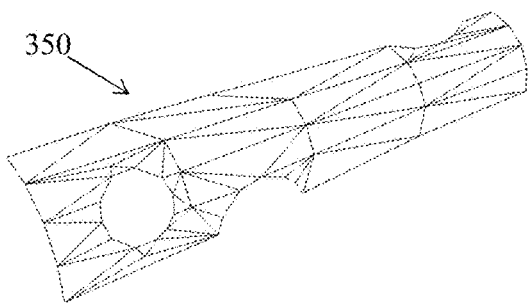
Figure 36:
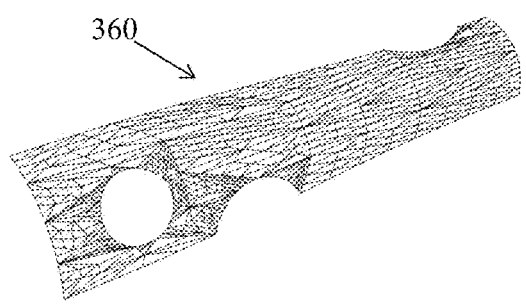
Figure 37:
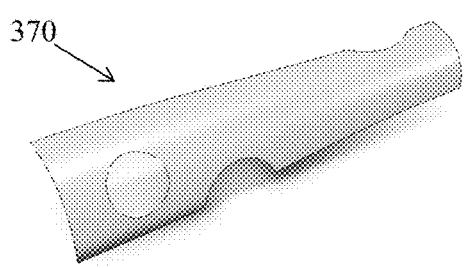
Figure 38:
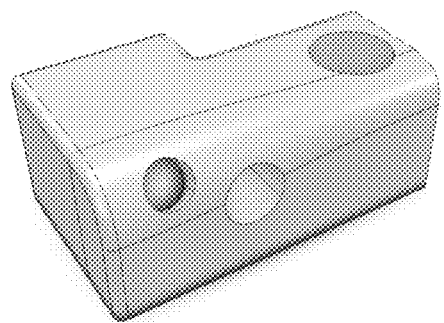

FIGS. 35-36 respectively show how face 146 is partitioned to produce partition 350, which is then subdivided (including subdivision S50) to produce 2D mesh 360. FIG. 37 shows how 2D mesh 360 leads to the rendering 370 of trimmed surface corresponding to face 146. FIG. 38 shows how the method of the examples may perform a rendering of a whole body without cracks between the trimmed surfaces, thanks to evaluating the position of vertices of the 2D meshes fitting the boundary edges on the respective parametric curves.

Figure 39:
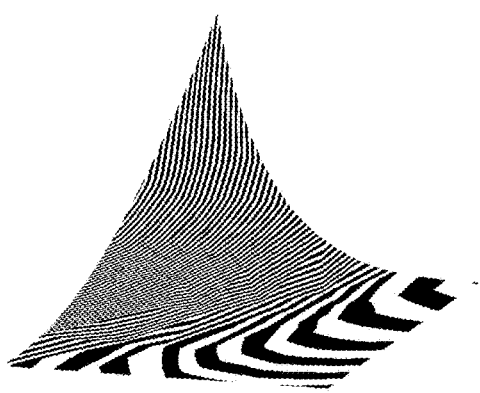
Figure 40:
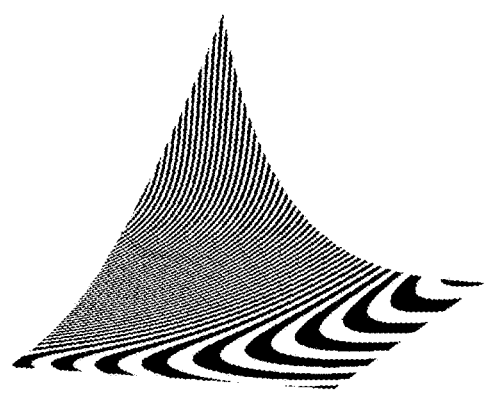

Surface analysis was applied to test the method. A well-known method is isophote analysis providing a visualization of surface irregularities and discontinuities for reflecting surfaces, which cannot be seen with a shaded surface. It analyses surfaces by mapping black and white stripes computed from light direction and surface normals. When surface normals are not well approximated, the isophotes analysis brings to light surface defaults. FIG. 39, with artifacts, shows a surface rendered using a traditional algorithm (PNT). On the contrary, FIG. 40 shows how applying the method leads to the rendering of the same surface, but without any artifacts between stripes.

What is claimed is:

1. A method, implemented by a computer system, for parameterizing a three-dimensional modeled object for tessellation, comprising the steps of:

providing a boundary representation of the modeled object, the boundary representation comprising geometrical data including parametric surfaces and topological data including a set of faces each defined as a portion of a 2D domain of a respective parametric surface;

determining, for each respective face, a respective 2D mesh fitting said respective face, comprising the steps of:

subdividing boundary edges of the respective face into parametric arcs, wherein each parametric arc is 2D and defined as a function of one parameter, the function of one parameter outputting values in the 2D domain of the respective parametric surface defining the respective face, defining a set of vertices within the respective face, the vertices being points defined on the portion of the 2D domain of the respective parametric surface defining the respective face, and determining a partition of the respective face with parametric patches bounded by the parametric arcs and the vertices of the set of vertices, wherein each parametric patch is 2D and defined as a function of two parameters, the function of two parameters outputting values in the 2D domain of the respective parametric surface defining the respective face;

associating the 2D meshes to the geometrical data of the boundary representation, the 2D meshes comprising the parametric patches, wherein at least one of the parametric patches includes a curved side; and storing the 2D meshes associated to the geometrical data on non-volatile memory of the computer system or sending the 2D meshes associated to the geometrical data to another computer system, wherein the stored 2D meshes associated to the geometrical data or the sent 2D meshes associated to the geometrical data represent the modeled object parameterized for tessellation.

2. The method of claim 1, wherein the parametric patches of the partition each have boundary arcs that do not cross each other and/or oneself, and/or the parametric patches of the partition avoid inner inversion.

3. The method of claim 1, wherein determining the 2D meshes further comprises, for each respective face, subdividing the partition according to criteria including at least a maximal deviation between the 3D meshes and the respective parametric surfaces.

4. The method of claim 3, wherein the criteria according to which subdividing the partition is performed further include a maximal number of times for further subdividing the 2D meshes before a step of determining 3D meshes by evaluating the position of vertices of the 2D meshes on the respective parametric surfaces.

5. The method of claim 1, wherein the subdividing of boundary edges of the respective face into parametric arcs is performed until none of the arcs cross each other.

6. The method of claim 1, wherein at least one of: (i) the parametric arcs are 2D Bézier arcs outputting values in the 2D domain of the respective parametric surface defining the respective face and (ii) the parametric patches are 2D Bézier patches outputting values in the 2D domain of the respective parametric surface defining the respective face.

7. The method of claim 1, wherein for each pair of faces having a common boundary edge, the 2D meshes are determined to share the same vertices fitting the common boundary edge.

8. A method, implemented by a computer system, for tessellating a three-dimensional modeled object parameterized for tessellation, comprising the steps of:
providing, by retrieval from non-volatile memory of the computer system or by reception from another computer system, 2D meshes associated, according to the method of claim 1, to geometrical data of a boundary representation of the modeled object, the boundary representation comprising the geometrical data including parametric surfaces and topological data including a set of faces each defined as a portion of the 2D domain of a respective parametric surface, the 2D meshes each forming a partition of a respective face with parametric patches bounded by vertices within the respective face and by parametric arcs that correspond to a subdivision of boundary edges of the respective face; and
determining 3D meshes by evaluating the position of vertices of the 2D meshes on the respective parametric surfaces.

9. The method of claim 8, wherein the method further comprises subdividing the 2D meshes before determining the 3D meshes.

10. The method of claim 9, wherein the 2D meshes are associated to the geometrical data of the boundary representation of the modeled object according to claim 4, and the subdividing the 2D meshes before determining the 3D meshes is performed said maximal number of times.

11. The method of claim 8, wherein the geometrical data include parametric curves representing intersections between the parametric surfaces and the faces of the boundary representation each have boundary edges each defined as a portion of the domain of a respective parametric curve, and determining the 3D meshes further comprises evaluating the position of vertices of the 2D meshes fitting the boundary edges on the respective parametric curves.

12. The method of claim 8, wherein the method further comprises associating to the 3D meshes normal vectors computed based on their respective parametric surfaces.

13. A computer program product, comprising:
a non-transitory computer readable storage medium coupleable to a computer system, the computer readable storage medium having instructions for parameterizing a three-dimensional modeled object for tessellation by:
providing a boundary representation of the modeled object, the boundary representation comprising geometrical data including parametric surfaces and topological data including a set of faces each defined as a portion of a 2D domain of a respective parametric surface;
determining, for each respective face, a respective 2D mesh fitting said respective face by:
subdividing boundary edges of the respective face into parametric arcs, wherein each parametric arc is 2D and defined as a function of one parameter, the function of one parameter outputting values in the 2D domain of the respective parametric surface defining the respective face,
defining a set of vertices within the respective face, the vertices being points defined on the portion of the 2D domain of the respective parametric surface defining the respective face, and
determining a partition of the respective face with parametric patches bounded by the parametric arcs and the vertices of the set of vertices, wherein each parametric patch is 2D and defined as a function of two parameters, the function of two parameters outputting values in the 2D domain of the respective parametric surface defining the respective face;
associating the 2D meshes to the geometrical data of the boundary representation, the 2D meshes comprising the parametric patches, wherein at least one of the parametric patches includes a curved side; and
storing the 2D meshes associated to the geometrical data on non-volatile memory of the computer system or sending the 2D meshes associated to the geometrical data to another computer system, wherein the stored 2D meshes associated to the geometrical data or the sent 2D meshes associated to the geometrical data represent the modeled object parameterized for tessellation.

14. A CAD system comprising a processor coupled to a memory and a graphical user interface, the memory having recorded thereon a computer program comprising instructions for performing a computer-implemented method for parameterizing a three-dimensional modeled object for tessellation, comprising the steps of:
providing a boundary representation of the modeled object, the boundary representation comprising geometrical data including parametric surfaces and topological data including a set of faces each defined as a portion of a 2D domain of a respective parametric surface;
determining, for each respective face, a respective 2D mesh fitting said respective face, comprising the steps of:
subdividing boundary edges of the respective face into parametric arcs, wherein each parametric arc is 2D and defined as a function of one parameter, the function of one parameter outputting values in the 2D domain of the respective parametric surface defining the respective face, defining a set of vertices within the respective face, the vertices being points defined on the portion of the 2D domain of the respective parametric surface defining the respective face, and determining a partition of the respective face with parametric patches bounded by the parametric arcs and the vertices of the set of vertices, wherein each parametric patch is 2D and defined as a function of two parameters, the function of two parameters outputting values in the 2D domain of the respective parametric surface defining the respective face;

associating the 2D meshes to the geometrical data of the boundary representation, the 2D meshes comprising the parametric patches, wherein at least one of the parametric patches includes a curved side; and storing the 2D meshes associated to the geometrical data on non-volatile memory of the CAD system or sending the 2D meshes associated to the geometrical data to another computer system, wherein the stored 2D meshes associated to the geometrical data or the sent 2D meshes associated to the geometrical data represent the modeled object parameterized for tessellation.

\* \* \* \* \*